April 25, 1967  R. E. YOUNG  3,315,923

PEDESTAL BLOCKS FOR MACHINE TOOLS AND THE LIKE

Filed Dec. 4, 1964

Inventor:
Raymond E. Young,
by
Atty.

3,315,923
PEDESTAL BLOCKS FOR MACHINE TOOLS
AND THE LIKE
Raymond E. Young, Harvey, Ill., assignor to Abbyville Corporation, Chicago, Ill., a corporation of Illinois
Filed Dec. 4, 1964, Ser. No. 416,006
9 Claims. (Cl. 248—24)

This invention relates to improvements in pedestal blocks for machine tools, and the like. The pedestals herein disclosed are primarily intended for insertion between the feet of shop and other machine tools, and the floor on which they stand, to improve the operative qualities of such tools especially by preventing or damping vibrations of such tools, including vibrations of the floor, transmitted to the locations of the tools in question; such floor vibrations originating generally at locations other than the locations of the tools themselves during their operations. Additionally, the pedestals herein disclosed are of such construction and materials, that they effectively resist and prevent "walking" of the tools which they support, during operation of such tools. The presently disclosed pedestals are so constituted, and are of material such as to have a very high co-efficient of friction on floors composed of conventional shop flooring materials, such as concrete, asphalt, wood etc. Due to this characteristic of the pedestals it is, in many cases, unnecessary to anchor the machine tools by bolts set into the floor or otherwise. The present pedestals are, however, of such structure and materials, that, if desired, they may in special cases be so installed as to meet the requirements imposed by so-called tilting machine tools— that is, tools which are so installed that they tilt backwardly, requiring support of their front legs at slightly higher elevations than the rear legs of such tools.

An important feature of the present pedestals is their ability to effectively damp vibrations without permitting any substantial amount or degree of springiness in the pedestals, which springiness would, under certain conditions result in an aggravation of the received vibrations from the floor. The pedestals herein disclosed are thus so constituted as to absorb vibrations of frequencies normally expected to arrive at the machine tool leg locations on the floor. Such absorption is due to the characteristics of the yieldable material incorporated into the pedestals, as well as their physical structure. Such physical structure includes the provision of springs having yield characteristics such as to take a substantial portion of the weight delivered to the pedestal by the machine tool leg supported by such pedestal; combined with a block of material having yield characteristics having elasticity combined with an "internal friction or resistance" characteristic which will produce a damping quality to damp vibrations of the normally expected frequencies to thus avoid attainment of resonance within the block under the weight or load being carried by such block; such block of material also carrying a portion of the weight. Thus a pedestal is produced in which the weight is divided between the springs and the block of material, ensuring such division of weight in manner to substantially avoid vibrations of resonant nature, under the condition of receiving the triggering vibrations of normally expected frequency, from the floor.

One feature of importance contained in the presently disclosed pedestals comprises provision for making it possible to adapt the pedestal to meet the needs imposed by a wide range of weights delivered by the machine tool leg to the pedestal. That is, each pedestal of given size of the block of material, may be used with helical springs of various characteristics of size; or a given block of the material may be used with a single stiff spring alone; or the body of material may be used with a pair of lighter springs; or the block of material may be used with two pairs of such lighter springs; or the block of material may be used with the stiff spring in combination with a greater number of lighter springs; or pairs of the lighter springs may be used with the stiffer spring. In each such case the block of material has been combined with one or more helical springs; and when so combined the combination of the block of material will be possible with various combinations of stiff or light springs, or stiff and light springs, to meet the needs imposed by the weight of the load coming from the machine tool leg, and the expected vibrational conditions to be encountered. In each case the overall characteristics of the block of material together with the spring or springs used therewith may be selected to meet specified conditions of weight, vibration, etc. Thus a standard size and contour of the block of material may be readily combined with one or more helical springs, either all of the same size characteristics, or of different sizes and characteristics.

The block of material is provided with vertical sockets of size to receive the springs by simple insertion into such sockets. Preferably the pattern of such sockets includes a central socket to receive the stiff spring, together with a plurality of smaller sockets to receive the lighter springs, and surrounding such central socket. Preferably such smaller sockets are of an even number, and spaced equally and oppositely to each side of the central socket, so that insertion of pairs of the lighter springs into oppositely located pairs of sockets will produce a balanced arrangement of the springs around the central socket, and the stiff spring if in place in such socket.

Preferably, also, all of the springs are of unloaded length the same as the vertical dimensions of the several sockets, in which case all of the springs are brought into effective compression simultaneously with start of the loading, and start of compression of the block of material. Or, if desired, one or more of the helical springs may be shorter than the vertical dimension of its socket, in which case such spring will start loading after the block of material (and other helical springs) has already been compressed to some extent, and thus has already commenced to receive load; or one or more of the helical springs may be pre-loaded by making it longer than the socket into which it is set, so that it is placed under a certain amount of pre-load before the block of material (and other helical springs) has commenced to take load.

The block of material has embedded into it a plate near and parallel to its bottom surface. This plate is perforated so that the material of the block may be formed through such perforations, thus binding the block material above and below such plate into a homogeneous integrated body. Such plate also extends across each of the sockets at the lower end thereof, to thus provide a floor of such socket, against which the lower end of the correspondingly inserted spring shall bear and transmit its load through the mass of the body of material beneath such socket and into the surrounding portions of the mass thereof. Conveniently, another plate is embedded in the upper portion of the block of material. This plate is provided with holes registering with the upper ends of the sockets beneath such holes, to permit insertion of the springs through such holes into the sockets, and removal of the springs from the sockets upon occasion. This embedded plate is also provided with holes, generally threaded, to receive a top plate set onto the top surface of the block of material, and serving as an anchor plate to which the lower end portion of the machine tool leg may be secured, either directly or indirectly.

From the foregoing it will be apparent that I have provided a unitary structure having a versatile usability to meet the requirements of weight to be sustained, and other conditions of usage imposed by the nature of the machine tool being supported.

Other objects and uses of the invention will appear from a detailed description of the same, which comprises the features of construction and combinations of parts hereinafter described and claimed.

Figure 1:
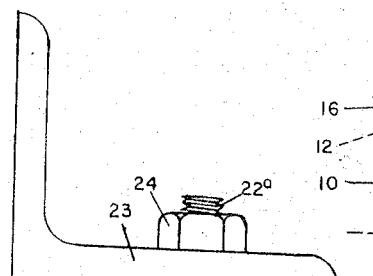
FIGURE 1 shows a side edge view of an embodiment of my pedestal block, set onto a floor, and which block has connected to its upper portion a threaded stud to which the lower end of a machine tool leg is shown adjustably connected by companion upper and lower nuts.
Figure 4:
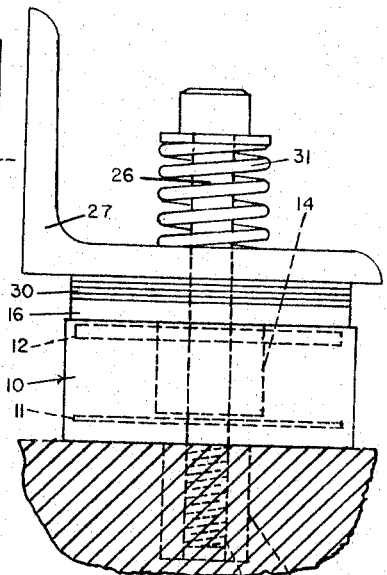
Figure 5:
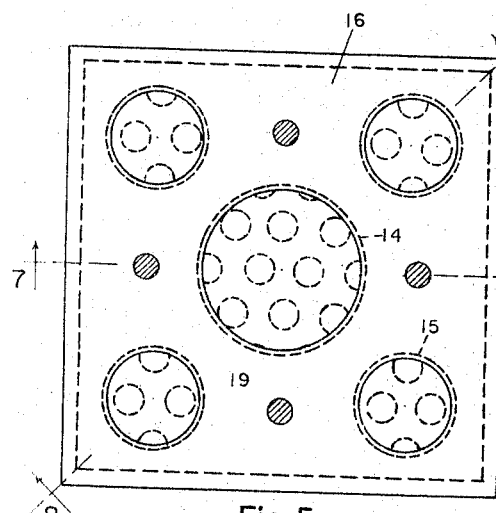
Figure 6:
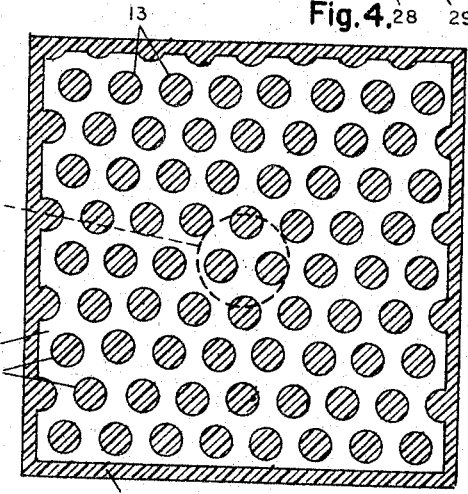
Figure 7:
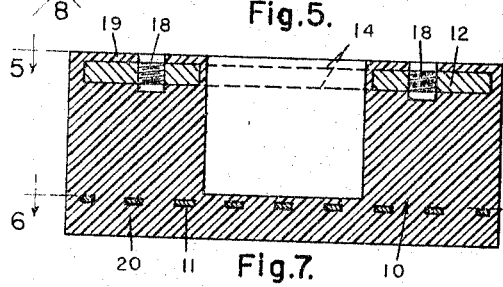
Figure 8:
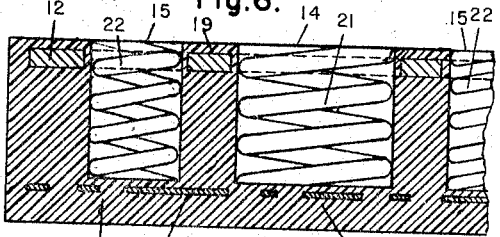

FIGURE 4 shows another view corresponding to FIGURE 1, but the block of FIGURE 4 is shown as itself being anchored to a stud threaded into a floor socket and held in place under compression of an intermediate spring, with several shims set into place to ensure exactly the proper elevation of a machine tool leg which is secured to such block, also under force of such spring; this embodiment being useful for securing the front leg of a tilted machine tool properly in place, and against rearward overtilt, while also providing the benefits of the present invention in various manners;

FIGURE 5 is a horizontal section taken on the lines 5—5 of FIGURES 1 and 7, looking down as shown by the arrows;

FIGURE 6 is a horizontal section taken on the lines 6—6 of FIGURES 1 and 7, looking down as shown by by the arrows;

FIGURE 7 shows a vertical cross-section taken on the line 7—7 of FIGURE 5, looking in the direction of the arrows; and this figure shows the central large spring socket but none of the smaller spring sockets; and FIGURE 8 shows a vertical cross-section taken on the line 8—8 of FIGURE 5, looking in the direction of the arrows; and this figure is cut away at its right-hand portion due to lack of space on the sheet; and this figure shows the central spring socket and one of the corner sockets for the lighter springs; springs being shown in all of such sockets.

The present pedestal block comprises a block of moulded polyurethane elastomer, being a mouldable plastic having considerable elasticity but small internal resistance (molecular resistance). As an example of a suitable material I mention the material produced by E. I. du Pont de Nemours Company, and marketed under the name "Adiprene." Such material is referred to in the bulletin titled "Engineering Properties of Urethane Elastomers," by J. G. DiPinto and S. D. McCready, such bulletin published by said Du Pont Company, January 1963, and giving various technical data for various forms of the polyurethane elastomers. Reference is made in said bulletin, page 9, to such Adiprene and some of its qualities. Included in such qualities which are important in the blocks herein disclosed for pedestal purposes, is excellent abrasion resistance, combined with a high coefficient of friction when in engagement under pressure, with such floorings as concrete, asphalt, raw wood, etc. The compression characteristics of such materials are referred to at page 5 of said bulletin, including showings of compressive strain vs. compressive stress. A satisfactory such material has a compressive stress of substantially 2400 p.s.i. to produce compressive strain of substantially 30%, and a compressive stress of substantially 1500 p.s.i. to produce a compressive strain of substantially 20%, the load surface being bonded to metal plates in each stated condition. Such material known as "Adiprene L," of Shore hardness A 80, has a compressive strain at 10%, of substantially 8500 p.s.i., and when of Shore hardness A 85, has a compressive strain at 10%, of substantially 1250 p.s.i. Such a material may have a resilience (shown by oscillogram test) of substantially 76% (first swing), for material of substantially Shore hardness A 80. The specific gravity of such a material is substantially 1.10.

The foregoing data characterize a polyurethane elastomer suitable for use in producing the block already referred to, and are given as illustrative of a suitable material; but I do not intend to limit myself to such material and characteristics, except as I may do so in the claims.

In the figures the block of material is designated 10. The plate 11 is embedded into the lower portion of the block, and the plate 12 is embedded into the upper portion of the block. Such plate 11 is preferably foraminated, being provided with the numerous holes 13 through which the material of the block is moulded thus providing numerous linkages between the material of the block above and below such plate. The upper plate is provided with a central hole 14 of size to accommodate the larger, centrally located spring, and with pairs of smaller holes 15 oppositely disposed with respect to such central hole, to accommodate the smaller springs. These holes will be further referred to hereinafter. It is noted that such upper plate 12 is substantially thicker and stiffer than the lower plate. Such greater thickness of the upper plate is provided to enable connection of a top plate 16 thereto, by the screws 17, threaded into the screw holes 18 of such plate 12.

The block of material completely encloses both of the plates 11 and 12, extending laterally slightly beyond the perimeters of such plates as shown in FIGURES 6, 7 and 8, and elsewhere; and such material also extends below the plate 11 and above the plate 12, as shown in such figures. Thus, both of the plates are fully encased and moulded into the block of material during the forming and setting of the plastic material from which the block is produced. Such overlying material is shown at 19 and such underlying material is shown at 20, in various figures. When placed in use by setting the pedestal on the floor, such underlying material 20 comes into direct supporting contact with the floor, thus providing an anti-slipping engagement of the pedestal with the floor, proportionate to the high coefficient of friction between the block material and the floor material, proportionate to the weight being supported by the pedestal. It is also seen from examination of FIGURES 5, 7 and 8 that the plastic material of the block also provides a coating of such material over each of the holes 14 and 15 of the upper plate 12, and that each of such holes comprises the upper portion of the corresponding socket. Each of the sockets extends down to a location slightly above the surface of the lower plate 11, the plastic material overlying the plate at such location to provide a rather thin coating on the plate, shown in FIGURES 7 and 8.

A larger helical spring 21 is set down into the central socket, resting on the floor of such socket, and being supported by the lower plate 11, through the overlying thin layer of the plastic. Such spring is of size to substantially fill the socket, generally with a slight clearance from the socket wall; but engagement of the spring convolutions with the surface of the socket will be against the plastic covering at the location of the hole 14. The surface of the socket is the surface of the moulded plastic as shown. Each of the smaller sockets receives a correspondingly small helical spring 22. These springs also rest on the floors of their sockets, being also supported by the lower plate 11 through the thin layer of plastic thereon, and the surface walls of these smaller sockets are also of plastic as shown.

Each of the springs is shown as of unloaded length to bring its upper end flush with the top surface of the block of material (see FIGURE 8) so that when the top plate 16 is set down onto the top surface of the block, it will come just into engagement with each of such springs. If desired, however, each or selected ones of the springs may be made of length either greater or less than the depth of the corresponding socket as desired. When such a spring is of length greater than the depth of its socket the spring will be preloaded when the plate 16 is secured in place; and vice versa, when such spring is of length less than the depth of its socket, it will not commence to take load until the block of material itself has been compressed sufficiently to bring such top plate into engagement with such spring. In the former case the intercept between the characteristic curve of loading vs. depression of the upper plate 16 will lie to the left of the Y-axis of such characteristic curve—in the latter case such intercept will lie to the right of such Y-axis.

Under any condition of loading imposed on the pedestal the depression of the top plate 16 will produce compression of the spring or springs, and simultaneous compression of the material of the block, to the point of balance. Since the characteristic curve of loading vs. depression of the block material alone will take a portion of the load (except in the case of a light loading and less length of the springs than the depths of their sockets), it follows that a combined or total curve of loading vs. depression must take into account the characteristic curves of both the springs and the block of plastic material.

It is also evident that the natural period of vibration of the pedestal which includes both the characteristics of the springs and of the block of plastic material, under a stated loading will depend on a combination of factors including the characteristics of each of the springs, and the characteristics of the block of material, according to a complex equation, and including the internal resistance or molecular resistance of the several components of the block. It is desirable to produce a combination of the several elements of the block which will have a natural period substantially greater than or less than the frequency of the shocks and/or vibrations coming to the pedestal, generally through the floor itself.

I have found that by forming the block of such a polyurethane material as previously disclosed herein, or using a material having substantially the characteristics previously disclosed herein and exemplified by such example of material, I have produced pedestal blocks which are admirably adapted to the purposes of supporting machine tools of various kinds, with substantial elimination of shocks and/or vibrations coming to the area of support of such machine tools. Thus, too, I have provided a form of pedestal of very versatile characteristics, since it is possible to set various combinations of springs into a given block of the material, to meet highly diversified conditions of loading and possible ranges of frequency of arriving vibrations. The characteristic of such material in the nature of its having a high frictional coefficient with respect to the flooring material, both for static and for dynamic conditions, serves to ensure against "walking" of the machine tool under the impulse of the arriving floor vibrations.

Figure 2:
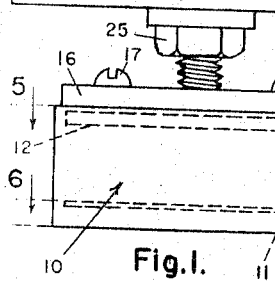
FIGURE 2 shows a side elevation of the pedestal block shown in FIGURE 1, but without the lower portion of the machine tool leg connected to such block.
Figure 2:
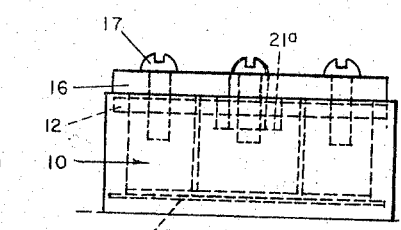
Figure 3:
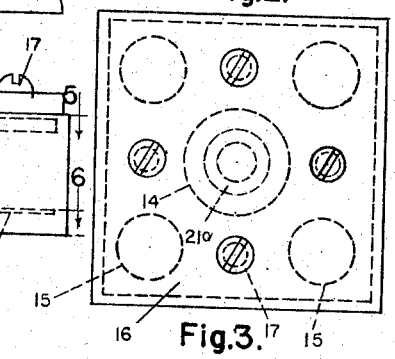
FIGURE 3 shows a top view corresponding to FIGURE 2.

Referring to FIGURES 2 and 3, I have therein shown a top plate 16 provided with a threaded nipple 21ª to which the lower end of the machine tool leg may be connected in suitable manner. In FIGURE 1 I have shown the top plate 16 as being provided with a threaded stem 22ª over which may be set the lower end portion 23 of the machine tool leg, being clamped in place by the upper and lower nuts 24 and 25, respectively. In FIGURE 4 I have shown a simple mounting arrangement for use in connection with the front (or back) legs of a tilted machine tool—one which is so mounted as to tilt backwardly when supported by the floor. In this case I have shown the stud 26 extended down through the leg 27 of the machine tool, through the top plate 16 and the socket 14 of the block of material, through the plate 11 and the lower surface portion of the plastic material, into a nipple or fixture 28 set into a socket 29 provided in the floor, to thus secure such stud permanently to the floor. If desired the stud may be set into the socket directly, and locked in place therein by concrete poured into such socket, according to conventional practice. The elevation of such machine tool leg may be adjusted by insertion of one or more shims 30 between the top plate 16 and the machine tool leg, and if necessary such shims may be of tapered thickness to produce the desired support, taking into account the degree of tilt which is produced. Such stud may be headed as shown in FIGURE 4, and a spring 31 may be introduced between such stud head and the leg of the machine tool to provide for continuous solid engagement of the machine tool leg with the shims, under the force produced by tightening the stud into the socket fixture 28.

Examination of FIGURE 6 shows that the plate 11 as therein shown is continuous beneath the socket 14 through which the stud 26 of FIGURE 4 must extend for the production of the holding arrangement of such FIGURE 4. In FIGURE 6 I have indicated, by the dashed circle 32 an opening through such plate 11 and through the plastic material, to accommodate such stud 26 when using the pedestal according to the showing of such FIGURE 4.

I claim:

1. A machine tool floor supported pedestal, comprising in combination, a moulded block of elastic polyurethane plastic having substantially flat parallel top and bottom faces; a first foraminated plate of stiff sheet material moulded into and completely encased by the material of the elastic block in proximity to the bottom face of such block and with the material of the block including a sheet of the block material below the foraminated plate for supporting engagement with a floor, said foraminated plate being provided with numerous foraminations, the plastic material extending through the foraminations to bind the sheet of block material below the foraminated plate to the block material above such foraminated plate, said block material being bonded to the top and bottom faces of such foraminated plate; an attaching plate of stiff material moulded into and completely encased by the material of the elastic block in proximity to the top face of such block, said attaching plate being embedded into the block and the block material being bonded to the top and bottom faces of such attaching plate; a central spring receiving socket extending downwardly from the top of the elastic block and through the material of the elastic block with the floor of such socket within the elastic block at a location above the foraminated plate; a vertically compressible spring located in said socket and having its lower end supported by the floor of the socket and its upper end in proximity to the top face of elastic block; a mounting plate seated against the top face of the plastic block; and means extending between the mounting plate and the attaching plate to connect the mounting plate and the attaching plate together.

2. A machine tool floor supported pedestal as defined in claim 1, wherein the polyurethane material at the bottom face of the elastic polyurethane block has a high coefficient of friction when in engagement with the floor material under the load of the machine tool.

3. A machine tool floor supported pedestal as defined in claim 1, wherein said material, when under a compressive stress of substantially 2400 p.s.i. has a compressive strain of substantially 30%, and when under a compressive stress of substantially 1500 p.s.i., has a compressive strain of substantially 20%.

4. A machine tool floor supported pedestal as defined in claim 1, wherein said material of the elastic block has a Shore hardness of substantially A 80, and a compressive strain at 10% of substantially 850 p.s.i.

5. A machine tool floor supported pedestal as defined in claim 1, together with a plurality of spring receiving sockets located equidistant laterally from the central spring receiving socket, each of such sockets extending through the elastic block and having its floor within the material of the elastic block and above the first foraminated plate with springs located in said plurality of spring receiving sockets, each having its lower end supported by the floor of the corresponding socket, and its upper end in proximity to the top face of the block.

6. A machine tool floor supported pedestal as defined in claim 5, wherein the plurality of sockets are located in opposing pairs at opposite sides of the central socket.

7. A machine tool floor supported pedestal as defined in claim 1, wherein the upper end of the spring is in engagement with the under face of the mounting plate.

8. A machine tool floor supported pedestal as defined in claim 7, wherein said spring is preloaded.

9. A machine tool floor supported pedestal as defined in claim 1, together with means to connect the pedestal to the lower end of a machine tool supporting element, comprising a threaded stud connected to the mounting plate and extending upwardly from such plate.

References Cited by the Examiner

UNITED STATES PATENTS

| 1,754,308 | 4/1930 | Cowell et al. | 248—22 |
| 1,876,640 | 9/1932 | Dobson | 248—22 |
| 2,189,708 | 2/1940 | Coyne | 248—21 |
| 2,911,207 | 11/1959 | Coble et al. | 248—22 X |
| 3,099,103 | 7/1963 | Wright | 248—188.8 |
| 3,160,549 | 12/1964 | Caldwell et al. | 248—358 X |

FOREIGN PATENTS 619,168  3/1949  Great Britain.

CLAUDE A. LE ROY, *Primary Examiner.*

JOHN PETO, *Examiner.*